US011006269B2

(12) United States Patent
Baghel et al.

(10) Patent No.: US 11,006,269 B2
(45) Date of Patent: May 11, 2021

(54) TECHNIQUES FOR FACILITATING CO-EXISTENCE OF RADIO ACCESS TECHNOLOGIES IN WIRELESS COMMUNICATIONS

(71) Applicant: QUALCOMM Incorporated, San Diego, CA (US)

(72) Inventors: Sudhir Kumar Baghel, Hillsborough, NJ (US); Shailesh Patil, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/515,797

(22) Filed: Jul. 18, 2019

(65) Prior Publication Data
US 2020/0029202 A1   Jan. 23, 2020

Related U.S. Application Data

(60) Provisional application No. 62/701,189, filed on Jul. 20, 2018.

(51) Int. Cl.
*H04W 8/24* (2009.01)
*H04W 72/04* (2009.01)
(Continued)

(52) U.S. Cl.
CPC ......... *H04W 8/24* (2013.01); *H04W 72/0453* (2013.01); *H04W 72/1289* (2013.01);
(Continued)

(58) Field of Classification Search
CPC ....... H04W 8/24; H04W 48/10; H04W 48/12; H04W 72/04; H04W 72/042;
(Continued)

(56) References Cited

U.S. PATENT DOCUMENTS 10,448,364 B2* 10/2019 Nguyen .............. H04W 72/005
10,477,552 B2* 11/2019 Chen ..................... H04L 5/0092
(Continued)

FOREIGN PATENT DOCUMENTS

WO      2017134578 A1    8/2017
WO   WO-2017168391 A1 * 10/2017 ............ H04W 76/14

OTHER PUBLICATIONS

3GPP TS 36.300 V13.3.0 "Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP Draft; Draft 36300-D30 Update1 With REV Marks, 3rd Generation Partnership Project (3GPP), Mobile Competence Centre; 650, Route Des Lucioles; F-06921 Sophia-Antipolis Cedex; France, Mar. 26, 2016 (Mar. 26, 2016), XP051081598, 302 Pages, Retrieved from the Internet: URL:http://www.3gpp.org/ftp/tsg_ran/WG2_RL2/Specifications/201603_draft_specs_after_RAN_71/ [retrieved on Mar. 26, 2016].
(Continued)

*Primary Examiner* — Tri H Phan
(74) *Attorney, Agent, or Firm* — Arent Fox LLP

(57) ABSTRACT

Aspects described herein relate to transmitting, to at least one base station, at least one indication of a capability to simultaneously transmit using two different radio access technology (RAT) sidelinks over respective frequency bands. An indication of resources, corresponding to a first RAT sidelink of the two different RAT sidelinks, to exclude in assigning first resources, corresponding to a first RAT sidelink of the two different RAT sidelinks, can also be transmitted to the at least one base station or a second base station. One or more resource grants assigning at least one of the first resources for transmitting using the first RAT sidelink of the two different RAT sidelinks or second resources for transmitting using the second RAT sidelink of
(Continued)

the two different RAT sidelinks can be received from the at least one base station or the second base station.

31 Claims, 6 Drawing Sheets

(51) Int. Cl.
  *H04W 72/14* (2009.01)
  *H04W 76/16* (2018.01)
  *H04W 72/12* (2009.01)
  *H04W 76/14* (2018.01)
  *H04W 88/06* (2009.01)

(52) U.S. Cl.
  CPC ........... *H04W 72/14* (2013.01); *H04W 76/16* (2018.02); *H04W 76/14* (2018.02); *H04W 88/06* (2013.01)

(58) Field of Classification Search
  CPC . H04W 72/0453; H04W 72/12; H04W 72/14; H04W 72/1284; H04W 72/1289; H04W 76/14; H04W 76/16; H04W 88/06; H04W 92/18; H04L 5/00; H04L 5/0053; H04L 5/0092
  See application file for complete search history.

(56) References Cited

U.S. PATENT DOCUMENTS

| | | | |
|---|---|---|---|
| 10,575,304 B2* | 2/2020 | Faurie | H04W 72/1205 |
| 10,616,940 B2* | 4/2020 | Vutukuri | H04W 76/15 |
| 10,638,501 B2* | 4/2020 | Huang | H04W 72/1284 |
| 2017/0127405 A1 | 5/2017 | Agiwal et al. | |
| 2020/0170059 A1* | 5/2020 | Belleschi | H04W 16/14 |
| 2020/0229188 A1* | 7/2020 | Tang | H04W 72/04 |
| 2020/0236518 A1* | 7/2020 | Lee | H04W 4/44 |

OTHER PUBLICATIONS

Huawei (Rapporteur): "Introduction of NB-IoT", 3GPP Draft; R2-162068-36 300 Running CR To Capture Agreements on NB-IOT Clean, 3rd Generation Partnership Project (3GPP), Mobile Competence Centre; 650, Route Des Lucioles ; F-06921 Sophia-Antipolis, vol. RAN WG2, No. St Julian's, Malta; 20160215-20160219, Mar. 7, 2016 (Mar. 7, 2016), XP051081859, 288 Pages, Retrieved from the Internet: URL:http://www.3gpp.org/ftp/tsg_ran/WG2_RL2/TSGR2_93/Docs/ [retrieved on Mar. 7, 2016] paragraph [23.9]—paragraph [23.12].

International Search Report and Written Opinion—PCT/US2019/042674—ISA/EPO—dated Nov. 5, 2019.

ZTE: "Discussion on Sidelink Resource Request Mechanism in PC5 CA", 3GPP Draft; R2-1713072, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, 7 Pages, XP051371900, Retrieved from the Internet: URL: http://www.3gpp.org/ftp/tsg%5Fran/WG2%5FRL2/TSGR2%F100/Docs/ [retrieved on Nov. 17, 2017] section 2.1.

* cited by examiner

TECHNIQUES FOR FACILITATING CO-EXISTENCE OF RADIO ACCESS TECHNOLOGIES IN WIRELESS COMMUNICATIONS

CLAIM OF PRIORITY UNDER 35 U.S.C. § 119

The present application for patent claims priority to Provisional Application No. 62/701,189, entitled "TECHNIQUES FOR FACILITATING CO-EXISTENCE OF RADIO ACCESS TECHNOLOGIES IN WIRELESS COMMUNICATIONS" filed Jul. 20, 2018, which is assigned to the assignee hereof and hereby expressly incorporated by reference herein for all purposes.

BACKGROUND

Aspects of the present disclosure relate generally to wireless communication systems, and more particularly, to facilitating co-existence of radio access technologies (RATs) in wireless communication systems, such as those including vehicle-based communication devices.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Some wireless communication networks include vehicle-based communication devices that can communicate from vehicle-to-vehicle (V2V), vehicle-to-infrastructure (V2I) (e.g., between a vehicle-based communication device and one or more road infrastructure nodes), vehicle-to-network (V2N) (e.g., between a vehicle-based communication device and one or more network nodes, such as a base station), a combination thereof and/or with other devices (which can be referred to as vehicle-to-anything (V2X) communications). Third generation partnership project (3GPP) long term evolution (LTE) supports V2X communications, and support in 5G NR is developing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes transmitting, to at least one base station, at least one indication of a capability to simultaneously transmit using two different radio access technology (RAT) sidelinks over respective frequency bands, transmitting, to the at least one base station or a second base station an indication of resources, corresponding to a first RAT sidelink of the two different RAT sidelinks, to be excluded in assigning first resources, and receiving, from the at least one base station or the second base station, one or more resource grants assigning at least one of the first resources for transmitting using the first RAT sidelink of the two different RAT sidelinks or second resources for transmitting using the second RAT sidelink of the two different RAT sidelinks.

In another example, a method for wireless communications is provided. The method includes receiving, from a user equipment (UE), at least one indication of a capability to simultaneously transmit using two different RAT sidelinks over respective frequency bands, receiving, from the UE, a time delta indication specifying a time delta from a first sidelink grant, corresponding to one of the two different RAT sidelinks, for a second sidelink grant, corresponding to another one of the two different RAT sidelinks, and transmitting, to the UE and based on receiving the time delta indication, the first sidelink grant and/or the second sidelink grant in such a way that the two sidelink grants do not overlap in time.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
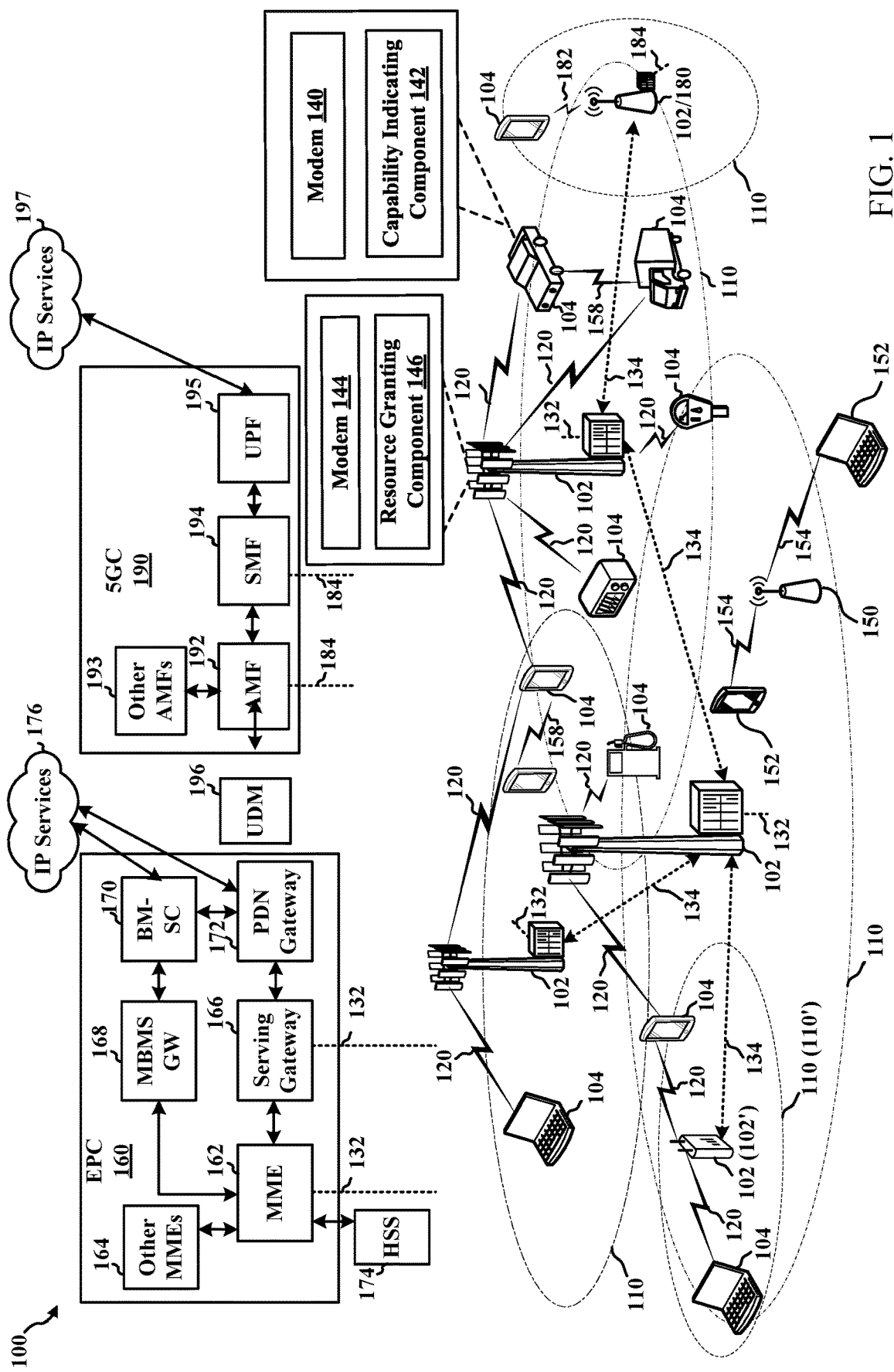
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to facilitating co-existence of multiple radio access technologies (RATs) in certain communication systems, such as device-to-device (D2D) communication technologies. For example, D2D communication technologies can include vehicle-to-vehicle (V2V) communications, vehicle-to-infrastructure (V2I) communications, (e.g., between a vehicle-based communication device and one or more road infrastructure nodes), vehicle-to-network (V2N) communications (e.g., between a vehicle-based communication device and one or more network nodes, such as a base station), a combination thereof and/or with other device, which can be collectively referred to as vehicle-to-anything (V2X) communications, which are currently supported in third generation partnership project (3GPP) long term evolution. In an example, V2X communications can include an access link for V2N communications between a vehicle-based communication device and one or more base stations, as well as a sidelink for communications between the vehicle-based communication device and one or more other vehicle-based communication devices or other devices (e.g., V2V, V2I, etc.). Accordingly, aspects described herein may be implemented in other types of networks as well, which may include multiple links such as an access link and a peer-to-peer (or D2D) link for devices, etc. Where different links are configured to use different RATs at a device, however, co-existence issues may arise within the device.

In an example, a device that supports more than one RAT for a given type of link and/or for all types of links may mitigate co-existence issues by indicating, to a base station, a capability for simultaneously transmitting using multiple RATs. In this example, the base station can schedule the device to use the multiple RATs over the multiple sidelinks. Where the device is not capable of simultaneous transmission using the multiple RATs, the device may mitigate associated interference between the RATs by indicating, to the base station, resources from a resource grant for a first sidelink associated with a first RAT to exclude in sidelink communications for the first RAT. The device can then use these resources to communicate using the second sidelink associated with a second RAT. In one example, the device can receive a second resource grant indicating resources for the second sidelink. In yet another example, the device may control an amount of first RAT transmission as a function of periodicity of an amount of the second RAT transmission to reduce transmissions of the second RAT when first RAT transmissions are occurring. In each example, co-existence issues between communications of the RATs are mitigated. In addition, though generally described in terms of a first and second RAT, the concepts described herein can be applied for additional RATs to facilitate coexistence of more than two RATs.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving.

In aspects described herein, wireless communication access network 100 includes at least one UE 104 with a modem 140 for communicating in a wireless network and a capability indicating component 142 for indicating a capability for simultaneously transmitting using multiple different RATs, as described above and further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem 144 for communicating in the wireless network and a resource granting component 146 for configuring resources over which one or more UEs 104 can communicate using one or more of the multiple RATs, as described further herein.

In an example, referring to the D2D communications described above, where the devices are vehicles or otherwise vehicle-based, the D2D communications between the devices (e.g., over sidelink 158) can be referred to as V2V communications, which are defined for 3GPP LTE and are being defined for 5G NR. When the vehicles or vehicle-based devices communicate with an infrastructure node that may be present on the road side (e.g., over a sidelink 158), this can be referred to as vehicle-to-infrastructure (V2I) communications. When the vehicles or vehicle-based devices communicate with a base station 102 or other network node (e.g., over a communication link 120), this can be referred to as vehicle-to-network (V2N) communications. The collection of at least V2V, V2I, and vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. Both NR-V2X and LTE-V2X can operate in a similar frequency space, such as a 5.9 GHz band corresponding to intelligence transportation systems (ITS).

When NR-V2X and LTE-V2X operate in a single device in adjacent channels in the ITS band, in-device co-existence issues may be experienced. For example, if LTE PC5 transmission, as defined for V2X communications, happens at a device (e.g., a UE 104), then the device might not be able to receive NR-PC5 communications during the same period of time and/or vice versa. In another example, due to device capability information, it may be possible that the device may not be able to transmit simultaneously on both LTE PC5 and NR PC5. PC5 can be the interface used for the sidelink communications in V2X. Moreover, for example, an LTE base station (e.g., eNB) may schedule both LTE PC5 and NR PC5, and/or a 5G NR base station (e.g., gNB) can schedule both NR PC5 and LTE PC5 in a mode 3 manner. For example, mode 3 can be defined in LTE and can relate to a mechanism for assigning radio resources in V2X communications where the network (e.g., including one or more base stations 102) assigns resources to the devices. In an example, mode 4 can also be defined in LTE and can be used where devices can autonomously select radio resources using a distributed scheduling scheme and/or congestion control mechanisms (e.g., listen-before-talk (LBT) and/or the like).

Accordingly, a UE 104 participating in D2D communications (such as a V2X communication device that can provide a UE function as part of or otherwise within a vehicle) can indicate, via capability indicating component 142, a simultaneous transmission capability for LTE-PC5 and NR-PC5 to a base station 102 (e.g., eNB, gNB, etc.) per band combination, and the base station 102 can use this information in scheduling sidelink resources to the UE 104. Where the UE 104 does not support simultaneous sidelink transmissions using LTE-PC5 and NR-PC5, however, the UE 104 can cause the base station 102 to not assign sidelink resources for NR-PC5 over sidelink resources used for LTE-PC5, and/or vice versa, in mode 3. For example, the UE 104 may use a resource exclusion indication, as described further herein, which can be based on an indication from capability indicating component 142, to indicate resources to not assign in LTE-PC5, which can then be used for NR-PC5, and/or vice versa. In yet another example, where the UE 104 does not support simultaneous sidelink transmissions using LTE-PC5 and NR-PC5, the UE 104 can autonomously exclude LTE-V2X subframe time for NR-V2X LBT (or quality-of-service (QoS) mechanism) in mode 4.

Figure 2:
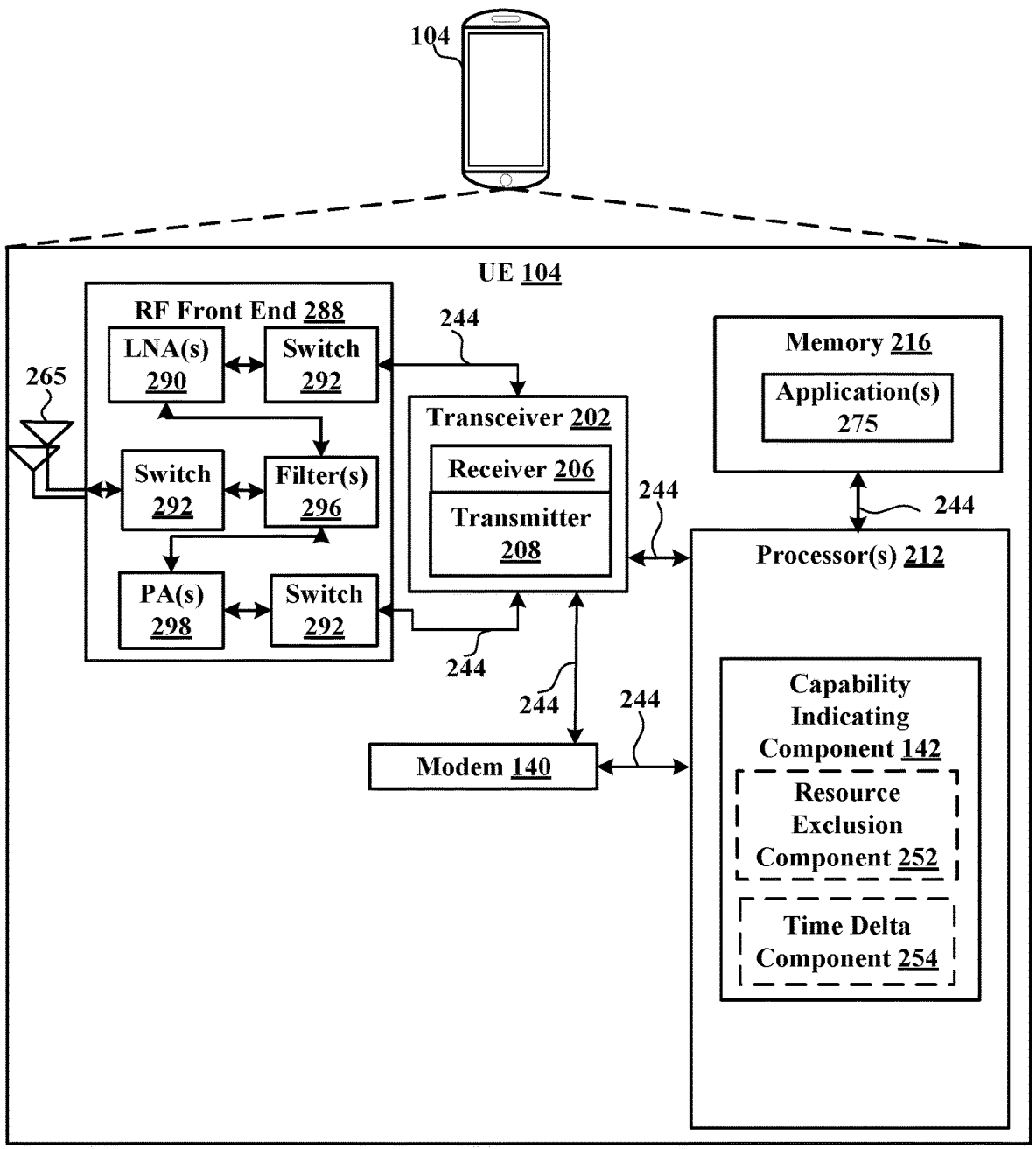
FIG. 2 is a block diagram illustrating an example of a UE, in accordance with various aspects of the present disclosure.
Figure 3:
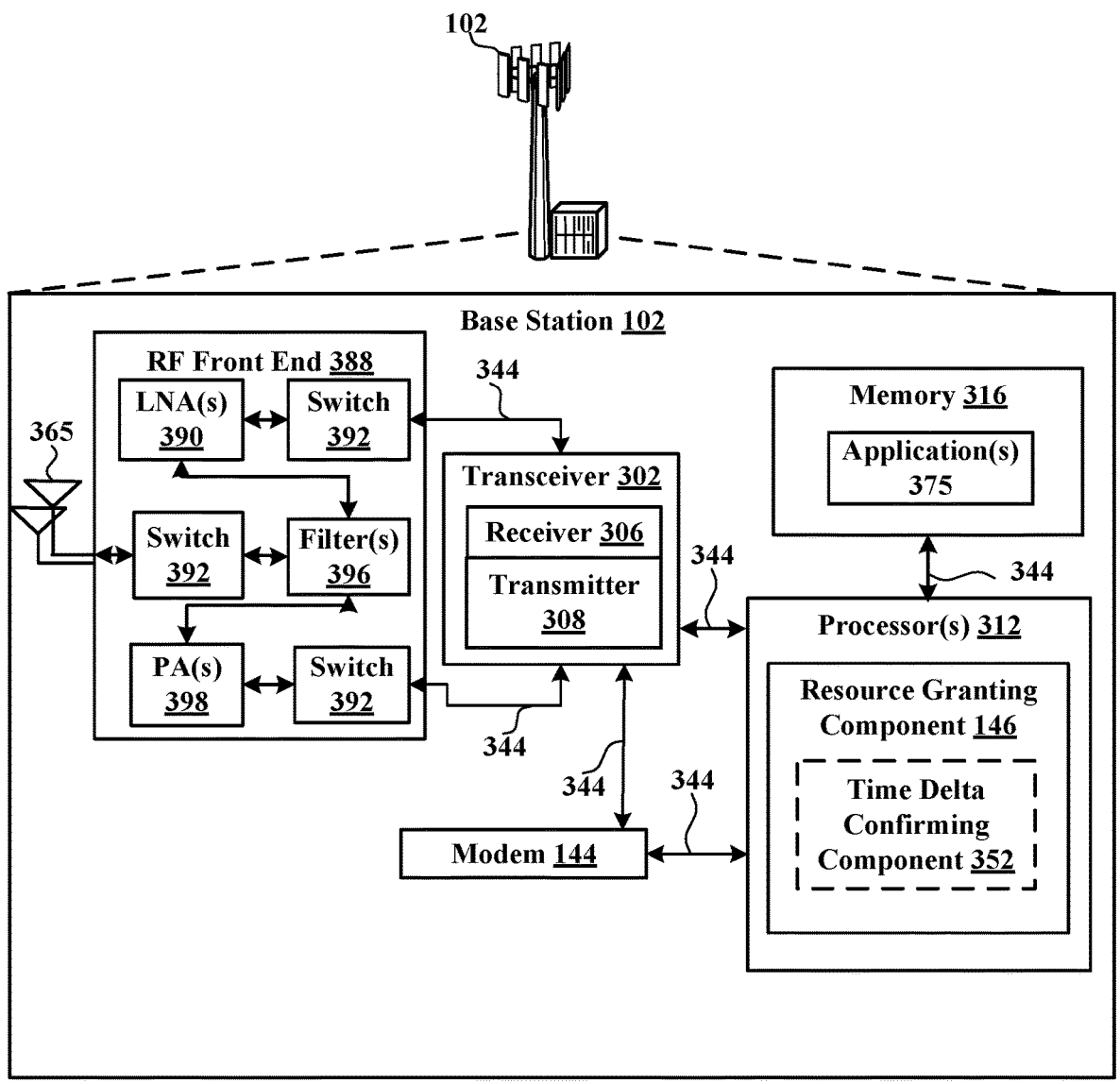
FIG. 3 is a block diagram illustrating an example of a base station, in accordance with various aspects of the present disclosure.
Figure 4:
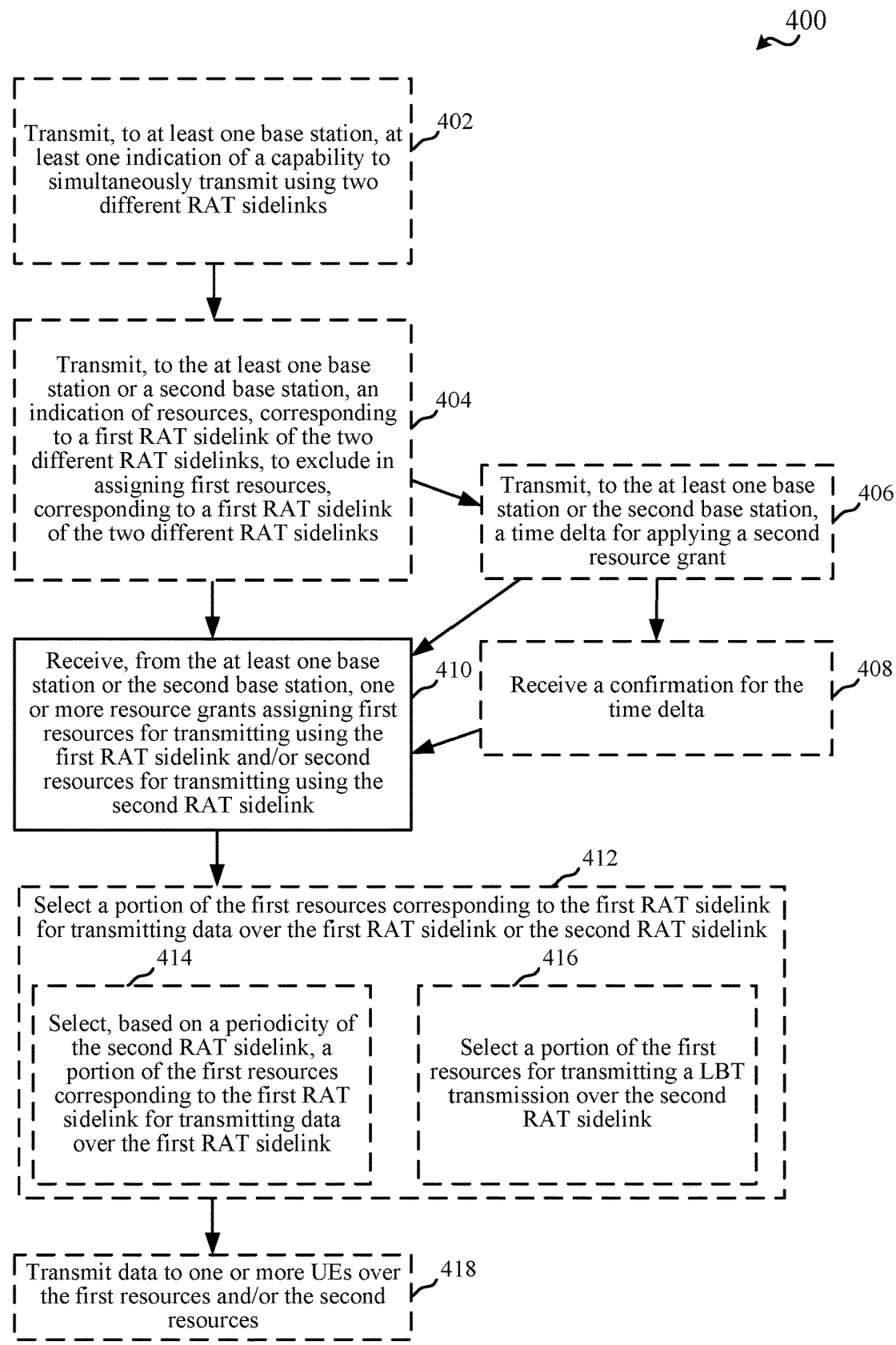
FIG. 4 is a flow chart illustrating an example of a method for indicating a capability to simultaneously transmit using two different radio access technologies (RATs), in accordance with various aspects of the present disclosure.
Figure 5:
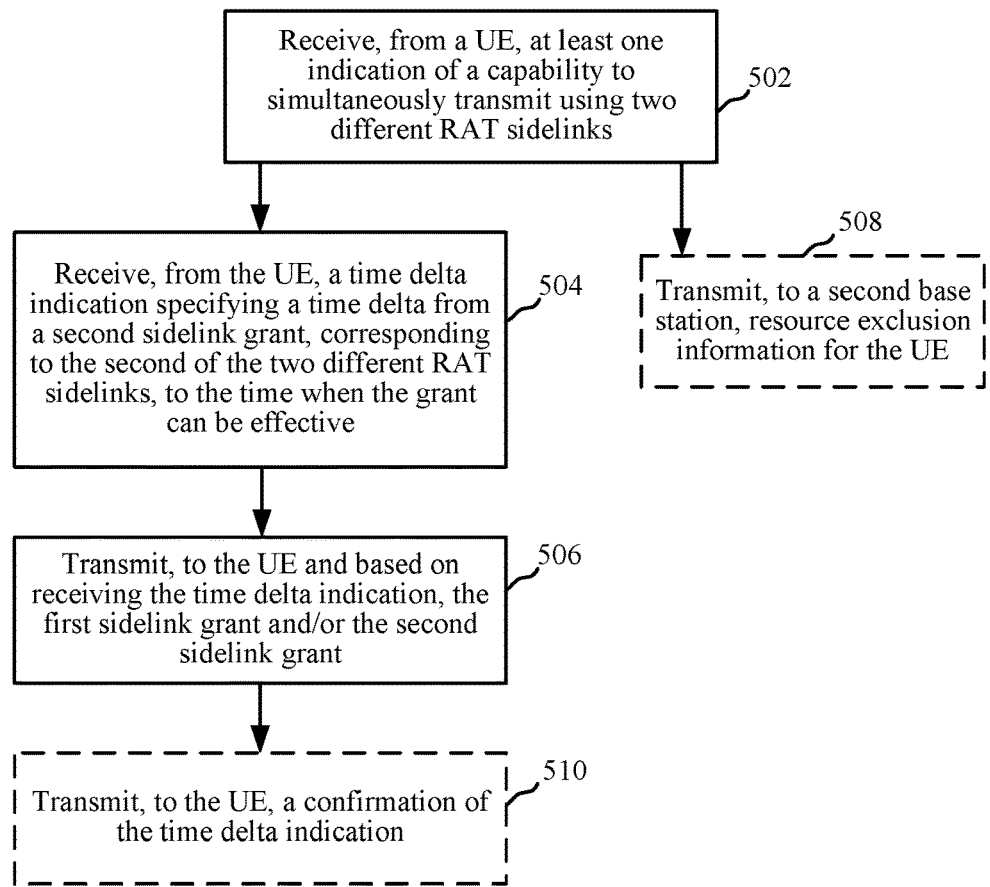
FIG. 5 is a flow chart illustrating an example of a method for confirming a time delta for communicating using two different RATs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or capability indicating component 142 to enable one or more of the functions described herein related to indicating or utilizing a capability to simultaneously transmit (or not) communications using multiple RAT sidelinks, etc.

In an aspect, the one or more processors 212 can include a modem 140 and/or can be part of the modem 140 that uses one or more modem processors. Thus, the various functions related to capability indicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with capability indicating component 142 may be performed by transceiver 202.

Also, memory 216 may be configured to store data used herein and/or local versions of applications 275 or capability indicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining capability indicating component 142 and/or one or more of its subcomponents, and/or data associated therewith, when UE 104 is operating at least one processor 212 to execute capability indicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, capability indicating component 142 can optionally include a resource exclusion component 252 for indicating a set of resources to exclude in granting resources to the UE 104, and/or a time delta component 254 for indicating a time delta between when a resource grant is received and when the resource grant is used to determine resources for communications.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and resource granting component 146 for granting resources to a UE 104 for communicating with base station 102 over an access link and/or for communicating with one or more other UEs over a sidelink.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, resource granting component 146 can optionally include a time delta confirming component 352 for confirming a time delta indication received from a UE 104 related to the UE 104 using resources from a resource grant to communicate with one or more other UEs over the sidelink.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for indicating a capability (or inability) for simultaneous transmission using multiple RATs. In an example, a UE 104 can perform the functions described in method 400 using one or more of the components described in FIGS. 1-2.

In method 400, optionally at Block 402, at least one indication of a capability to simultaneously transmit using two different RAT sidelinks can be transmitted to at least one base station. In an aspect, capability indicating component 142, e.g., in conjunction with processor(s) 212, memory 216, transceiver 202, etc., can transmit, to the at least one base station (e.g., base station 102), at least one indication of a capability to simultaneously transmit using two (or more) different RAT sidelinks. For example, the indication can be an indication that the UE 104 can or cannot simultaneously transmit (e.g., to one or more other UEs) using the two (or more) different RAT sidelinks. For example, capability indicating component 142 can transmit the indication per band or combination of bands. For example, the indication can include one or more sets of band combinations in the multiple RATs over which the UE 104 can support (or does not support) simultaneous transmissions, which may include indications each or a subset of bands of the multiple RATs. Moreover, for example, capability indicating component 142 can transmit the indication as an explicit indication in radio resource control (RRC) or other higher layer signaling, over a dedicated control channel for the UE 104 (e.g., over physical uplink control channel (PUCCH) resources), etc. In addition, for example, capability indicating component 142 can transmit the indication based on a request from the base station 102, based on establishing connection with the base station 102, based on being configured, by the base station 102 and/or the second base station, for communicating over multiple RAT sidelinks, etc.

In method 400, optionally at Block 404, an indication of resources, corresponding to a first RAT sidelink of the two different RAT sidelinks, to exclude in assigning first resources, corresponding to a first RAT sidelink of the two different RAT sidelinks, can be transmitted to the at least one base station or a second base station. In an aspect, resource exclusion component 252, e.g., in conjunction with processor(s) 212, memory 216, transceiver 202, capability indicating component 142, etc., can transmit, to the at least one base station or the second base station, the indication of resources, corresponding to the first RAT sidelink of the two different RAT sidelinks, to exclude in assigning first resources, corresponding to a first RAT sidelink of the two different RAT sidelinks. For example, resource exclusion component 252 can indicate the resources in a resource exclusion message that specifies a set of resources that should not be assigned to the UE 104 for transmitting using the first RAT sidelink. In one specific example, the resource exclusion message can include resource exclusion defined for LTE-PC5 interface (based on a mode 3 assignment of resources from the base station 102) that can be used, by UEs, for generally indicating resources that should not be assigned to the UE for communicating using the corresponding RAT sidelink.

For example, the resource exclusion may provide a mechanism for the UE 104 to indicate, to the base station 102, such resources that should not be assigned to the UE 104 to transmit using first RAT sidelink. In a specific example, the UE 104 can utilize the resource exclusion to indicate, to the base station 102, a pattern of resource exclusion (e.g., a pattern of resources to exclude in mode 3 assignment), and then can use these resources for transmitting over a second RAT sidelink so that transmissions using the two different RAT sidelinks can happen at different time instances. In other words, in an example, the UE 104 can then use the resources indicated in the resource exclusion for the first RAT sidelink to transmit using a second RAT sidelink of the two different RAT sidelinks, as described further herein. In one example, this can be effectuated by the at least one base station 102 or the second base station granting the resources indicated in the resource exclusion of the first RAT for communications using the second RAT sidelink. In a specific example, the UE 104 may indicate the resource exclusion to an LTE base station and can use the resources for transmitting NR-PC5 sidelink transmissions (and can transmit LTE-PC5 sidelink transmission over other resources for which a resource grant is received from the LTE base station).

Moreover, in an example, resource exclusion component 252 can transmit the resource exclusion to the second base station to facilitate a sidelink resource grant over the excluded resources from the second base station. In the specific example above, the resource exclusion component 252 can transmit the resource exclusion not only to the LTE base station 102 so that the LTE base station 102 does not assign the excluded resources, but can also transmit the resource exclusion to a NR base station to allow the NR base station to grant NR resources to the UE 104 over the resources excluded from LTE communications for transmitting over the NR sidelink. In another example, the LTE base station 102 can provide the resource exclusion information to the NR base station and/or the LTE base station and the NR base station may be the same base station, and the NR base station can accordingly assign resources to the UE 104 indicated in the resource exclusion to allow the UE 104 to transmit NR-PC5 sidelink transmission over the resources excluded from LTE-PC5.

In method 400, optionally at Block 406, a time delta for applying a second resource grant can be transmitted to the at least one base station or the second base station. In an aspect, time delta component 254, e.g., in conjunction with processor(s) 212, memory 216, transceiver 202, capability indicating component 142, etc., can transmit, to the at least one base station 102 or the second base station, the time delta for applying the second resource grant. For example, the time delta component 254 can transmit the time delta as an indication of a time that the UE 104 is to wait between receiving a resource grant for one of the two different RATs and applying or otherwise using the granted resources. For example, as inter stack communication between the two RATs (e.g., between LTE firmware and NR firmware) can be different for different UEs depending on mechanism used, the UE 104 can indicate the time delta x for applying the resource grant in a subframe, or other time period for communication, that is at n+4+delta x, where n is the current subframe or other time period during which the resource grant is received. In an example, the time delta can be within a minimum allowed value and/or a maximum allowed value that may be configured at the UE 104. For example, the UE 104 may receive a configuration, e.g., from the base station 102 (e.g., an LTE eNB) or the second base station (e.g., 5G NR gNB), which can relate to whichever base station is scheduling mode 3 resource for other technology, as described above.

In addition, in method 400, optionally at Block 408, a confirmation for the time delta can be received. In an aspect, time delta component 254, e.g., in conjunction with processor(s) 212, memory 216, transceiver 202, capability indicating component 142, etc., can receive (e.g., from the base station 102 or the second base station) the confirmation for the time delta. For example, time delta component 254 can receive the confirmation in a radio resource control (RRC) message, a physical downlink control channel (PDCCH) message, and/or the like, from the base station 102 or the second base station, where the confirmation can be an acknowledgement that the base station received and can apply the time offset for receiving communications from the UE 104, and/or may include an adjustment to the time delta, which the UE 104 can apply for determining when to activate one or more sidelink resource grants received from the base station.

In method 400, at Block 410, one or more resource grants assigning first resources for transmitting using the first RAT sidelink and/or second resources for transmitting using the second RAT sidelink can be received from the at least one base station or the second base station. In an aspect, capability indicating component 142, e.g., in conjunction with processor(s) 212, memory 216, transceiver 202, etc., can receive, from the at least one base station or the second base station (e.g., base station 102), the one or more resource grants assigning the first resources for transmitting using the first RAT sidelink and/or the second resources for transmitting using the second RAT sidelink. For example, a first resource grant can grant resources, to the UE 104, for transmitting over a first sidelink using the first RAT (e.g., LTE or 5G NR) or over a second sidelink using the second RAT (e.g., 5G NR or LTE). In one example, as described further herein, the at least one base station or the second base station (e.g., base station 102) may use the resource exclusion for the first RAT in determining a set of resources (the first resources) for the resource grant for the first RAT (e.g., to exclude the indicated resources). In another example, as described further herein, the at least one base station or the second base station (e.g., base station 102) may use the resource exclusion for the first RAT in determining the second resources for the second resource grant to grant resources, to the UE 104, for transmitting using the second RAT sidelink (e.g., to include the resources excluded for the first RAT), as described.

In method 400, optionally at Block 412, a portion of the first resources corresponding to the first RAT sidelink can be selected for transmitting data over the first RAT sidelink or the second RAT sidelink. In an aspect, capability indicating component 142, e.g., in conjunction with processor(s) 212, memory 216, transceiver 202, etc., can select the portion of the first resources corresponding to the first RAT sidelink for transmitting data over the first RAT sidelink or the second RAT sidelink. For example, selecting the portion of the first resources can correspond to selecting a time division of the resources (e.g., one or more symbols of a slot, a slot, a subframe, etc.) for transmitting over the first RAT sidelink or second RAT sidelink. In another example, selecting the portion of the first resources may additionally or alternatively include selecting frequency resources.

In one example, in selecting the portion of the first resources at Block 412, optionally at Block 414, a portion of the first resources corresponding to the first RAT sidelink can be selected for transmitting data over the first RAT sidelink. In an aspect, capability indicating component 142, e.g., in conjunction with processor(s) 212, memory 216, transceiver 202, etc., can select, based on the periodicity of the second RAT sidelink, the portion of the first resources corresponding to the first RAT sidelink for transmitting data over the first RAT sidelink. In one example, this can be used for mode 4 assignment of first RAT resources, and in this regard, receiving at Block 410 may include receiving a resource grant assigning second resources for transmitting using the second RAT sidelink. For instance, the capability indicating component 142 can control the amount of transmitting using the first RAT sidelink (e.g., NR in this example) as a function of periodicity of the second RAT sidelink (e.g., LTE in this example), which can be due to half duplex properties of LTE and/or of V2X communications. In this example, when the UE 104 is transmitting using LTE, the NR transmission frequency can be reduced. For example, capability indicating component 142 can determine the periodicity of resources assigned for the second RAT sidelink, and can accordingly select the portion of the first resources to use in transmitting over the first RAT sidelink based on the periodicity of the resources (e.g., the second resources) assigned for the second RAT sidelink. In another example, the UE 104 can take advantage of periodic nature of LTE V2X and capability indicating component 142 can avoid NR V2X transmissions continuously on period slots (e.g., by transmitting offset in time within respective slots).

In another example, in selecting the portion of the first resources at Block 412, optionally at Block 416, a portion of the first resources can be selected for transmitting a LBT transmission over the second RAT sidelink. In an aspect, capability indicating component 142, e.g., in conjunction with processor(s) 212, memory 216, transceiver 202, etc., can select the portion of the first resources for transmitting the LBT transmission over the second RAT sidelink. In this example, capability indicating component 142 can transmit 5G NR LBT transmissions over resources assigned to LTE V2X. In this example, the capability indicating component 142 can autonomously exclude transmitting data over scheduled resources to avoid collision between the two different RATs. For example, capability indicating component 142 can exclude LTE V2X subframes (or other divisions of time) for NR V2X LBT communications (or other QoS mechanisms).

In method 400, optionally at Block 418, data can be transmitted, to one or more UEs, over the first resources and/or the second resources. In an aspect, capability indicating component 142, e.g., in conjunction with processor(s) 212, memory 216, transceiver 202, etc., can transmit data to one or more UEs (e.g., sidelink transmissions) over the first resources (using the first RAT sidelink or second RAT sidelink, as described above) and/or the second resources granted for sidelink communications using the two different sidelink RATs. In one example, this can include transmitting data over selected portions of the resources selected at Block 414. In another example, this can include applying the time delta from Block 412 to determine when (e.g., within which subframe or other division of time) to transmit data over resources of the second resource grant, etc. For example, capability indicating component 142 can determine a time at which the sidelink grant is effective by applying the time delta to a current time during which the sidelink grant is received, and can transmit, to one or more UEs and based at least in part on determining occurrence of the time at which the sidelink grant is effective, data over the first resources or the second resources as indicated by the sidelink grant. Moreover (e.g., in mode 4 resource assignment), transmitting the data can occur over the selected portion of the first RAT resources based on a periodicity of the second RAT and/or the selected portion of the first RAT resources for LBT transmission over the second RAT sidelink.

FIG. 5 illustrates a flow chart an example of a method 500 for confirming a time delta received from a UE for applying resource grants related to multiple RATs. In an example, a base station 102 can perform the functions described in method 500 using one or more of the components described in FIGS. 1 and 3.

In method 500, at Block 502, at least one indication of a capability to simultaneously transmit using two different RAT sidelinks can be received from a UE. In an aspect, resource granting component 146, e.g., in conjunction with processor(s) 312, memory 316, transceiver 302, etc., can receive, from the UE (e.g., UE 104), at least one indication of the capability to simultaneously transmit using two different RAT sidelinks. For example, as described, resource granting component 146 can receive the at least one indication as an explicit indication of the capability, a resource exclusion to exclude resources of one RAT when assigning resources for another RAT sidelink (e.g., an indication that the capability is not supported), etc., as described above. In addition, resource granting component 146 can receive the at least one indication per band combination for one or more band combinations (e.g., combinations of bands in the two, or more, different RATs).

In method 500, at Block 504, a time delta indication specifying a time delta from a second sidelink grant, corresponding to the second of the two different RAT sidelinks, to the time when the grant can be effective. In an aspect, resource granting component 146, e.g., in conjunction with processor(s) 312, memory 316, transceiver 302, etc., can receive, from the UE (e.g., UE 104), the time delta indication specifying the time delta from the time of receiving the second sidelink grant, corresponding to the second of the two different RAT sidelinks, to the time when the second sidelink grant can be effective (e.g., when the resources thereof can be used for transmitting over the second RAT sidelink).

In method 500, at Block 506, the first sidelink grant and/or the second sidelink grant can be transmitted to the UE based on receiving the time delta indication. In an aspect, resource granting component 146, e.g., in conjunction with processor(s) 312, memory 316, transceiver 302, etc., can transmit, to the UE (e.g., UE 104) and based on receiving the time delta indication, the first sidelink grant and/or the second sidelink grant. As described, the UE 104 can determine resources over which to communicate with one or more UEs using the first sidelink grant and/or the second sidelink grant. The first sidelink grant can correspond to a first RAT and the second sidelink grant can correspond to a second RAT. Moreover, as described for example, the sidelink grants can indicate at least time resources and/or frequency resources over which to transmit communications over the respective sidelinks. In addition, for example, resource granting component 146 can assign the resources based on resource exclusion information that may be received from the UE 104, such that resources indicated to be excluded for the first RAT may be excluded from resources allocated for the first RAT and/or may be included in resources allocated for the second RAT, as described.

In this regard, in an example, optionally at Block 508, resource exclusion information for the UE can be transmitted to a second base station. In an aspect, resource granting component 146, e.g., in conjunction with processor(s) 312, memory 316, transceiver 302, etc., can transmit, to the second base station, resource exclusion information for the UE 104. In this regard, the second base station may use the resource exclusion information, which may correspond to the first RAT, for assigning resources for a second RAT sidelink, as described.

In method 500, optionally at Block 510, a confirmation of the time delta indication can be transmitted to the UE. In an aspect, time delta confirming component 352, e.g., in conjunction with processor(s) 312, memory 316, transceiver 302, resource granting component 146, etc., can transmit, to the UE (e.g., UE 104), the confirmation of the time delta indication. In an example, time delta confirming component 352 may ensure the base station 102 and/or another UE (e.g., for the sidelink grant) can comply with the requested time delta in communicating with the UE 104, and if so, can transmit the confirmation. For example, time delta confirming component 352 can transmit the confirmation using RRC, PDCCH, etc., as described.

Figure 6:
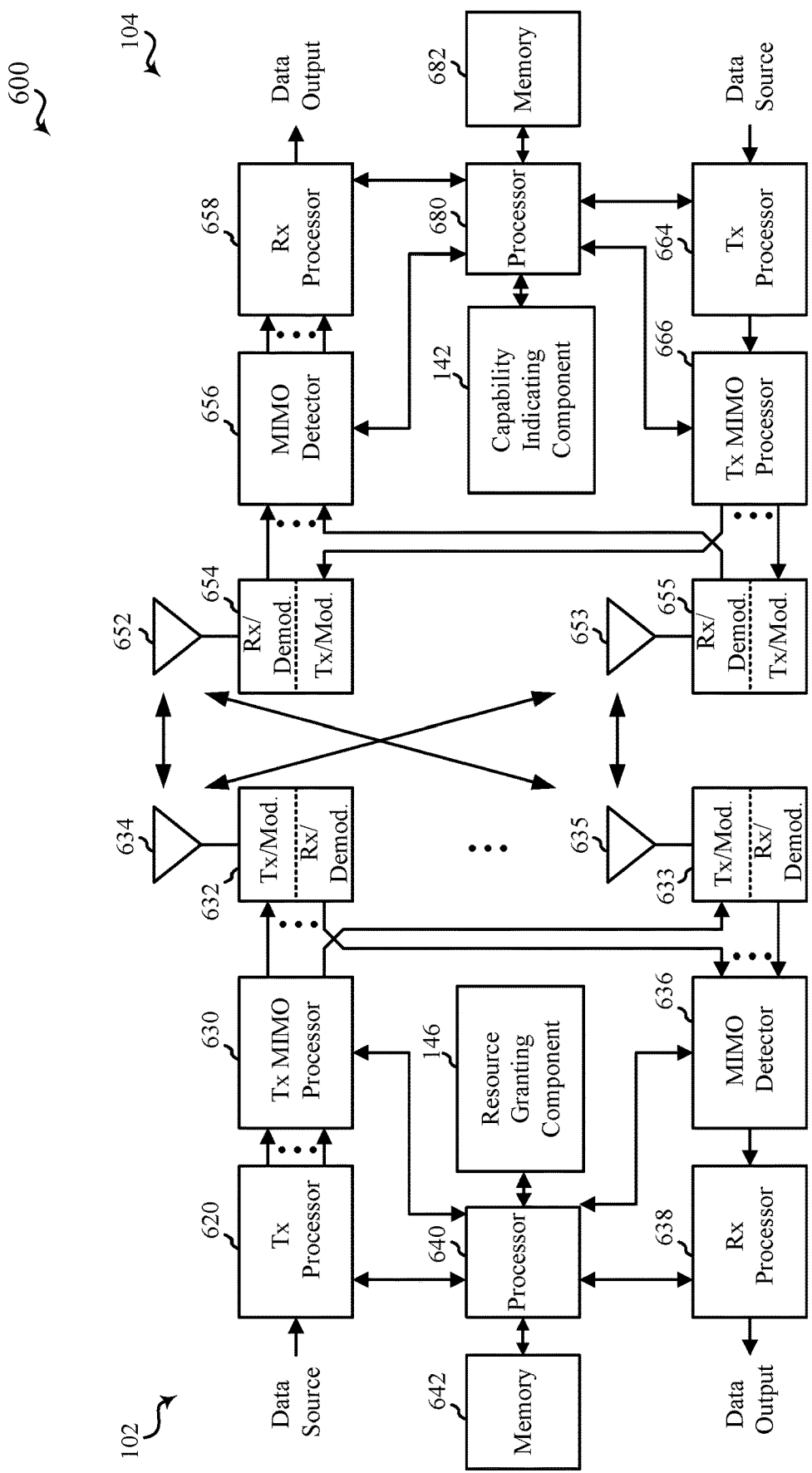
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a capability indicating component 142 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a resource granting component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
transmitting, to at least one base station, at least one indication of a capability to simultaneously transmit using two different radio access technology (RAT) sidelinks, that correspond to different RATs, over respective frequency bands;
transmitting, to the at least one base station or a second base station, an indication of resources, corresponding to a first RAT sidelink of the two different RAT sidelinks, to be excluded in assigning first resources, corresponding to the first RAT sidelink of the two different RAT sidelinks; and
receiving, from the at least one base station or the second base station and based on the capability or the indication of resources, one or more resource grants assigning at least one of the first resources for transmitting using the first RAT sidelink of the two different RAT sidelinks or second resources for transmitting using the second RAT sidelink of the two different RAT sidelinks, wherein the first RAT sidelink corresponds to a first RAT and the second RAT sidelink corresponds to a second RAT that is different than the first RAT.

2. The method of claim 1, further comprising transmitting data to one or more UEs over the first resources using the first RAT sidelink and over the second resources using the second RAT sidelink.

3. The method of claim 1, wherein the second resources include at least a portion of resources indicated in the indication of resources.

4. The method of claim 1, further comprising:
transmitting, to the at least one base station or the second base station, a time delta indication specifying a time delta for a sidelink grant corresponding to the one or more resource grants;
determining a time at which the sidelink grant is effective by applying the time delta to a current time during which the sidelink grant is received; and
transmitting, to one or more UEs and based at least in part on determining occurrence of the time at which the sidelink grant is effective, data over the first resources or the second resources as indicated by the sidelink grant.

5. The method of claim 4, further comprising receiving a confirmation for the time delta indication, wherein transmitting the data over the first resources or the second resources is based at least in part on receiving the confirmation.

6. The method of claim 4, further comprising:
receiving, from the at least one base station or the second base station, at least one of a maximum allowed value or minimum allowed value for the time delta; and
selecting the time delta based on at least one of the maximum allowed value or the minimum allowed value.

7. The method of claim 1, further comprising:
selecting a portion of the first resources specified in a first resource grant of the one or more resource grants for transmitting data using the first RAT sidelink of the two different RAT sidelinks; and
transmitting, to another UE, data over the portion of the first resources.

8. The method of claim 7, wherein selecting the portion of the first resources is based on a function of a periodicity associated with the second RAT sidelink of the two different RAT sidelinks.

9. The method of claim 7, wherein selecting the portion of the first resources comprises selecting the portion of the first resources that are offset in time within respective slots.

10. The method of claim 1, wherein the at least one indication includes multiple indications of capabilities to simultaneously transmit using the two different RAT sidelinks over multiple sets of respective frequency bands.

11. The method of claim 1, wherein the first RAT is fourth generation (4G) long term evolution (LTE) and the second RAT is fifth generation (5G) new radio (NR), or wherein the first RAT is 5G NR and the second RAT is 4G LTE.

12. An apparatus for wireless communication, comprising:
a transceiver;
a memory; and
one or more processors communicatively coupled with the transceiver and the memory, wherein the one or more processors are configured to:
transmit, to at least one base station, at least one indication of a capability to simultaneously transmit using two different radio access technology (RAT) sidelinks, that correspond to different RATs, over respective frequency bands;
transmit, to the at least one base station or a second base station, an indication of resources, corresponding to a first RAT sidelink of the two different RAT sidelinks, to be excluded in assigning first resources, corresponding to the first RAT sidelink of the two different RAT sidelinks; and
receive, from the at least one base station or the second base station and based on the capability or the indication of resources, one or more resource grants assigning at least one of the first resources for transmitting using the first RAT sidelink of the two different RAT sidelinks or second resources for transmitting using the second RAT sidelink of the two different RAT sidelinks, wherein the first RAT sidelink corresponds to a first RAT and the second RAT sidelink corresponds to a second RAT that is different than the first RAT.

13. The apparatus of claim 12, wherein the one or more processors are further configured to transmit data to one or more UEs over the first resources using the first RAT sidelink and over the second resources using the second RAT sidelink.

14. The apparatus of claim 12, wherein the second resources include at least a portion of resources indicated in the indication of resources.

15. The apparatus of claim 12, wherein the one or more processors are further configured to:
transmit, to the at least one base station or the second base station, a time delta indication specifying a time delta for a sidelink grant corresponding to the one or more resource grants;
determine a time at which the sidelink grant is effective by applying the time delta to a current time during which the sidelink grant is received; and
transmit, to one or more UEs and based at least in part on determining occurrence of the time at which the sidelink grant is effective, data over the first resources or the second resources as indicated by the sidelink grant.

16. The apparatus of claim 15, wherein the one or more processors are further configured to receive a confirmation for the time delta indication, wherein the one or more processors are configured to transmit the data over the first resources or the second resources based at least in part on receiving the confirmation.

17. The apparatus of claim 15, wherein the one or more processors are further configured to:
receive, from the at least one base station or the second base station, at least one of a maximum allowed value or minimum allowed value for the time delta; and
select the time delta based on at least one of the maximum allowed value or the minimum allowed value.

18. The apparatus of claim 12, wherein the one or more processors are further configured to
select a portion of the first resources specified in a first resource grant of the one or more resource grants for transmitting data using the first RAT sidelink of the two different RAT sidelinks; and
transmit, to another UE, data over the portion of the first resources.

19. The apparatus of claim 18, wherein the one or more processors are configured to select the portion of the first resources based on a function of a periodicity associated with the second RAT sidelink of the two different RAT sidelinks.

20. The apparatus of claim 18, wherein the one or more processors are configured to select the portion of the first resources at least in part by selecting the portion of the first resources that are offset in time within respective slots.

21. The apparatus of claim 12, wherein the at least one indication includes multiple indications of capabilities to simultaneously transmit using the two different RAT sidelinks over multiple sets of respective frequency bands.

22. An apparatus for wireless communication, comprising:
means for transmitting, to at least one base station, at least one indication of a capability to simultaneously transmit using two different radio access technology (RAT) sidelinks, that correspond to different RATs, over respective frequency bands;
means for transmitting, to the at least one base station or a second base station, an indication of resources, corresponding to a first RAT sidelink of the two different RAT sidelinks, to be excluded in assigning first resources, corresponding to the first RAT sidelink of the two different RAT sidelinks; and
means for receiving, from the at least one base station or the second base station and based on the capability or the indication of resources, one or more resource grants assigning at least one of the first resources for transmitting using the first RAT sidelink of the two different RAT sidelinks or second resources for transmitting using the second RAT sidelink of the two different RAT sidelinks, wherein the first RAT sidelink corresponds to a first RAT and the second RAT sidelink corresponds to a second RAT that is different than the first RAT.

23. The apparatus of claim 22, further comprising means for transmitting data to one or more UEs over the first resources using the first RAT sidelink and over the second resources using the second RAT sidelink.

24. The apparatus of claim 22, wherein the second resources include at least a portion of resources indicated in the indication of resources.

25. The apparatus of claim 22, further comprising:
means for transmitting, to the at least one base station or the second base station, a time delta indication specifying a time delta for a sidelink grant corresponding to the one or more resource grants;
means for determining a time at which the sidelink grant is effective by applying the time delta to a current time during which the sidelink grant is received; and
means for transmitting, to one or more UEs and based at least in part on determining occurrence of the time at which the sidelink grant is effective, data over the first resources or the second resources as indicated by the sidelink grant.

26. The apparatus of claim 25, further comprising means for receiving a confirmation for the time delta indication, wherein the means for transmitting the data over the first resources or the second resources is based at least in part on receiving the confirmation.

27. A non-transitory computer-readable medium, comprising code executable by one or more processors for wireless communication, the code comprising code for:
transmitting, to at least one base station, at least one indication of a capability to simultaneously transmit using two different radio access technology (RAT) sidelinks, that correspond to different RATs, over respective frequency bands;
transmitting, to the at least one base station or a second base station, an indication of resources, corresponding to a first RAT sidelink of the two different RAT sidelinks, to be excluded in assigning first resources, corresponding to the first RAT sidelink of the two different RAT sidelinks; and
receiving, from the at least one base station or the second base station and based on the capability or the indication of resources, one or more resource grants assigning at least one of the first resources for transmitting using the first RAT sidelink of the two different RAT sidelinks or second resources for transmitting using the second RAT sidelink of the two different RAT sidelinks, wherein the first RAT sidelink corresponds to a first RAT and the second RAT sidelink corresponds to a second RAT that is different than the first RAT.

28. The non-transitory computer-readable medium of claim 27, further comprising code for transmitting data to one or more UEs over the first resources using the first RAT sidelink and over the second resources using the second RAT sidelink.

29. The non-transitory computer-readable medium of claim 27, wherein the second resources include at least a portion of resources indicated in the indication of resources.

30. The non-transitory computer-readable medium of claim 27, further comprising:
code for transmitting, to the at least one base station or the second base station, a time delta indication specifying a time delta for a sidelink grant corresponding to the one or more resource grants;
code for determining a time at which the sidelink grant is effective by applying the time delta to a current time during which the sidelink grant is received; and
code for transmitting, to one or more UEs and based at least in part on determining occurrence of the time at which the sidelink grant is effective, data over the first resources or the second resources as indicated by the sidelink grant.

31. The non-transitory computer-readable medium of claim 30, further comprising code for receiving a confirmation for the time delta indication, wherein the code for transmitting the data over the first resources or the second resources is based at least in part on receiving the confirmation.

* * * * *